US008400581B2

(12) United States Patent
Noh et al.

(10) Patent No.: US 8,400,581 B2
(45) Date of Patent: Mar. 19, 2013

(54) BACK LIGHT UNIT AND LIQUID CRYSTAL DISPLAY COMPRISING THE SAME

(75) Inventors: Jae Heon Noh, Hwaseong-si (KR); Dong Seob Jang, Seoul (KR); Chang Hyun Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 409 days.

(21) Appl. No.: 12/656,610

(22) Filed: Feb. 4, 2010

(65) Prior Publication Data

US 2010/0214507 A1 Aug. 26, 2010

(30) Foreign Application Priority Data

Feb. 23, 2009 (KR) .................. 10-2009-0014815

(51) Int. Cl.
*G02F 1/1335* (2006.01)
(52) U.S. Cl. ............................. 349/64; 349/61
(58) Field of Classification Search .............. 349/61, 349/64
See application file for complete search history.

(56) References Cited

U.S. PATENT DOCUMENTS

| 5,617,500 | A | * | 4/1997 | Shionoya et al. ............. 385/132 |
|---|---|---|---|---|
| 6,802,619 | B2 | * | 10/2004 | Ohizumi et al. .............. 362/603 |
| 6,854,857 | B2 | * | 2/2005 | Hara et al. .................... 362/613 |
| 6,885,360 | B2 | * | 4/2005 | Hara et al. .................... 345/102 |
| 6,954,237 | B2 | * | 10/2005 | Ohizumi et al. ................ 349/63 |
| 6,991,358 | B2 | * | 1/2006 | Kokogawa ..................... 362/619 |
| 7,097,317 | B2 | * | 8/2006 | Kim ................................ 362/29 |
| 7,104,679 | B2 | * | 9/2006 | Shin et al. ..................... 362/626 |
| 7,223,010 | B2 | * | 5/2007 | Min et al. ...................... 362/628 |
| 7,898,613 | B2 | * | 3/2011 | Jung et al. ....................... 349/62 |
| 8,011,804 | B2 | * | 9/2011 | Han et al. ................. 362/249.02 |
| 2002/0080433 | A1 | * | 6/2002 | Baba ............................... 359/26 |
| 2003/0007343 | A1 | * | 1/2003 | Ohwada et al. ................ 362/31 |
| 2003/0067436 | A1 | * | 4/2003 | Hara et al. ..................... 345/102 |
| 2003/0117793 | A1 | * | 6/2003 | Shin et al. ....................... 362/31 |
| 2003/0165054 | A1 | * | 9/2003 | Ohizumi et al. ................ 362/31 |
| 2003/0174491 | A1 | * | 9/2003 | Ohizumi et al. ................ 362/31 |
| 2003/0174492 | A1 | * | 9/2003 | Ohkawa ......................... 362/31 |
| 2003/0227768 | A1 | * | 12/2003 | Hara et al. ...................... 362/31 |
| 2004/0080938 | A1 | * | 4/2004 | Holman et al. ............... 362/231 |
| 2004/0109244 | A1 | * | 6/2004 | Kokogawa .................... 359/831 |
| 2004/0207775 | A1 | * | 10/2004 | Min et al. ........................ 349/65 |
| 2005/0036083 | A1 | * | 2/2005 | Hayashi et al. ................. 349/63 |
| 2005/0122707 | A1 | * | 6/2005 | Kim ................................ 362/29 |
| 2006/0092618 | A1 | * | 5/2006 | Tanaka et al. ................... 362/19 |
| 2006/0152931 | A1 | * | 7/2006 | Holman ........................ 362/297 |
| 2006/0221612 | A1 | * | 10/2006 | Song et al. .................... 362/247 |
| 2006/0268537 | A1 | * | 11/2006 | Kurihara et al. ................ 362/34 |
| 2007/0002565 | A1 | * | 1/2007 | Han et al. ...................... 362/240 |
| 2007/0019439 | A1 | * | 1/2007 | Yu et al. ........................ 362/621 |

(Continued)

FOREIGN PATENT DOCUMENTS

KR 207071081 * 7/2007

*Primary Examiner* — K. Cyrus Kianni
(74) *Attorney, Agent, or Firm* — Staas & Halsey LLP

(57) ABSTRACT

Disclosed are a backlight unit capable of guiding light generated by LEDs to a light guide panel in order to eliminate brightness fault, as well as a light crystal display including the same. The backlight unit includes a light guide panel, an LED arranged at a lateral side of the light guide panel, and a light guide bar with at least one light diffusion pattern to scatter light generated by the LED and admit the scattered light into the light guide panel, thereby uniformly guiding the light generated by the LED to the light guide panel.

16 Claims, 8 Drawing Sheets

U.S. PATENT DOCUMENTS

| | | | |
|---|---|---|---|
| 2007/0091639 A1* | 4/2007 | Yoo | 362/612 |
| 2007/0146297 A1* | 6/2007 | Bang | 345/102 |
| 2007/0159845 A1* | 7/2007 | Hirota et al. | 362/600 |
| 2007/0171673 A1* | 7/2007 | Song et al. | 362/612 |
| 2007/0263408 A1* | 11/2007 | Chua | 362/612 |
| 2010/0309440 A1* | 12/2010 | Yamagishi et al. | 353/37 |

* cited by examiner

BACK LIGHT UNIT AND LIQUID CRYSTAL DISPLAY COMPRISING THE SAME

CROSS-REFERENCE TO RELATED APPLICATIONS

This application claims the priority benefit of Korean Patent Application No. 2009-14815, filed on Feb. 23, 2009 with the Korean Intellectual Property Office, the disclosure of which is incorporated herein by reference.

BACKGROUND

1. Field

Embodiments relate to a back light unit capable of uniformly guiding light generated by an LED to a light guide panel region in order to eliminate brightness fault and a liquid crystal display including the same.

2. Description of the Related Art

A liquid crystal display (LCD) displays an image by electrical or optical properties of liquid crystals. As compared to other display devices, an LCD has reduced thickness and light weight and may be operated at a low operating voltage with reduced power consumption. Therefore, LCDs are widely used for various purposes in industrial applications.

An LCD may have a liquid crystal display panel fabricated by sealing liquid crystal between two transparent sheets and applying a desired voltage thereto in order to alter directions of liquid crystal molecules which in turn varies light transmission efficiency so as to optically display an image, as well as a backlight assembly to provide light to the liquid crystal display panel.

The backlight assembly may have a light source such as a cold cathode fluorescent lamp (CCFL), an external electrode fluorescent lamp (EEFL), a flat fluorescent lamp (FFL), and the like. Since such CCFLs have limitations in terms of film thickness reduction and simplification of an apparatus, improved quality of the apparatus, etc., there is a trend towards use of a light emitting diode (LED) with improved performance such as high brightness, extended lifespan and/ or high color purity, as a light source. Moreover, since environmentally harmful substances such as mercury are subject to increasingly stringent regulations, use of CCFLs tends to decrease and CCFLs are gradually being replaced by LEDs, which are more environmentally friendly.

A backlight assembly using such LEDs as a light source may be classified into a direct type and a side-emitting type assembly in view of constructional features such as arrangement of the LED and shape of a light guide panel. Such direct type backlight assembly has a construction of LEDs aligned at a front side of the assembly, which makes a slim structure difficult to achieve and requires too many LEDs, causing increased production costs.

On the other hand, a side-emitting type LED backlight assembly has LEDs at both sides and leads light to a front side of the assembly via a light guide panel, so that an entire thickness of the backlight assembly is relatively decreased to attain a slim structure, as compared to the direct type assembly.

Since the side-emitting LED backlight assembly includes an LED which is a point light source to emit light at a certain radiation angle, if plural LEDs are aligned in a row, a dark spot at which emission of light is faint may exist between LEDs.

Briefly, the side-emitting type LED backlight assembly having LEDs directly aligned at lateral sides of a light guide panel as the point light source entails a hot spot problem in that light radiation angle regions and dark spot regions are repeated, causing non-uniform brightness.

SUMMARY

Therefore, it is an aspect of exemplary embodiments to provide a backlight unit capable of uniformly guiding light generated by an LED to a light guide panel in order to reduce non uniformity of brightness and to enhance light efficiency, as well as a liquid crystal display (LCD) including the backlight unit described above.

According to an exemplary embodiment, there is provided a backlight unit including: a light guide panel; at least one LED arranged at a lateral side of the light guide panel; and a light guide bar with a desired light diffusion pattern to scatter the light generated by the LED and admit the scattered light into the light guide panel.

The LED may be aligned to emit light in a direction far away from the light guide panel.

The light diffusion pattern may have a protrusion part extending in a length direction of the light guide bar.

The light diffusion pattern may include a first diffusion pattern positioned opposite the light guide panel.

The light diffusion pattern may include a second diffusion pattern positioned opposite the light guide panel, in order to scatter light admitted into the light guide panel.

The light guide bar may include: a light incident part having the first diffusion pattern to scatter light generated by the LED; a light exit part having the second diffusion pattern to scatter light admitted into the light guide panel; a light reflection part arranged between the light incident part and the light exit part, wherein the light incident part and the light exit part are positioned stepwise to each other.

The light reflection part may include a first reflecting part for total reflection of the light scattered by the first diffusion pattern, and a second reflecting part for total reflection of the light reflected by the first reflecting part toward the second diffusion pattern.

The LED emits light in a thickness direction of the light guide bar and the emitted light may be admitted into the light guide panel after being scattered by the light guide bar.

The light guide bar may include a base part in a plate form and a threshold part formed in a stepwise position at one end of the base part. The light incident part may be formed on a front side of the threshold part opposite to the LED and the light exit part may be formed on a front side of the base part opposite to the light guide panel.

Alternatively, the light guide bar may include a base part in a plate form and a depression part formed in a portion of the base part. The light incident part may be formed on a top side of the depression part opposite to the LED and the light exit part may be formed on a front side of the base part opposite to the light guide panel.

In another aspect of exemplary embodiments, a backlight unit according to an exemplary embodiment may include: a plurality of LEDs spaced at a certain interval; a light guide bar with a light diffusion pattern to convert light generated by the LEDs into a linear light source; and a light guide panel to receive the converted light from one side of the light guide bar.

The light guide bar may have a light incident part and a light exit part positioned opposite the light guide panel, wherein the light incident part and the light exit part are positioned stepwise to each other.

Alternatively, the light guide bar may be arranged to scatter light emitted from the LEDs in a thickness direction, followed by admitting the scattered light into the light guide panel.

The light diffusion pattern described above may include a first diffusion pattern positioned opposite the LEDs and a second diffusion pattern positioned opposite the light guide panel in order to scatter light admitted into the light guide panel.

The liquid crystal display according to an exemplary embodiment may include a liquid crystal panel to display an image and a backlight unit to provide light to the liquid crystal panel, wherein the backlight unit includes: a light guide panel; a plurality of point light sources arranged at a lateral side of the light guide panel; a light guide bar having at least one light diffusion pattern to scatter light generated by the point light sources so as to uniformly admit the light into the light guide panel.

The point light source generates light in an opposite direction or a thickness direction of the light guide panel, in order to extend a path of the light.

The light guide bar having the light diffusion pattern may include: a light incident part with a first diffusion pattern to scatter light generated by the point light sources; a light exit part with a second diffusion pattern to scatter the light admitted into the light guide panel; and a light reflection part arranged between the light incident part and the light exit part.

The point light source may include an LED.

Accordingly, the backlight unit and the liquid crystal display including the same according to an exemplary embodiment adopt a light guide bar to uniformly provide light generated by an LED to a light guide panel, thereby reducing non-uniformity of brightness and enhancing light efficiency.

BRIEF DESCRIPTION OF THE DRAWINGS

These and/or other aspects of exemplary embodiments will become apparent and more readily appreciated from the following detailed description, taken in conjunction with the accompanying drawings of which.

DETAILED DESCRIPTION

Figure 1:
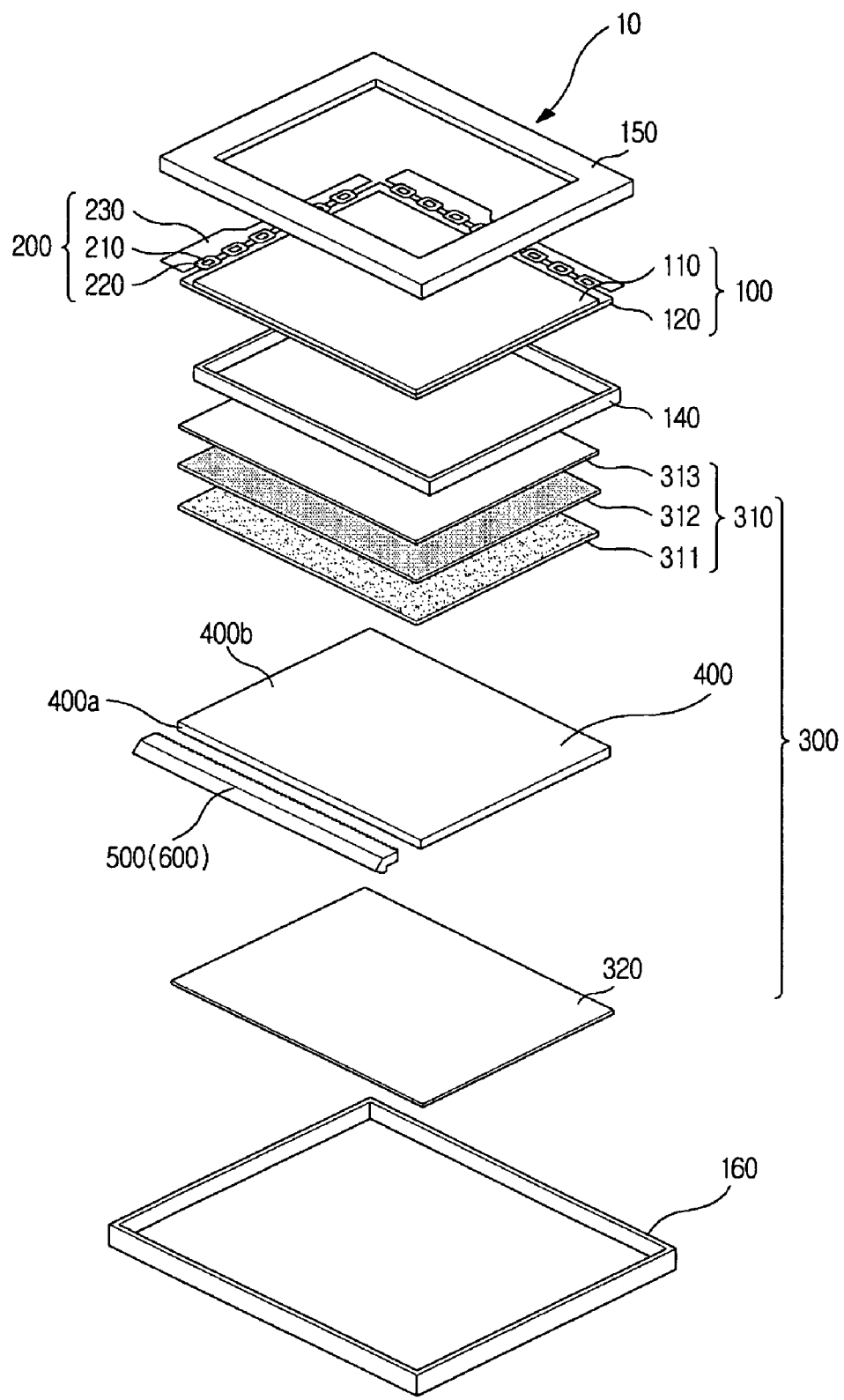
FIG. 1 is a perspective view illustrating a liquid crystal display according to an exemplary embodiment.

Reference will now be made in detail to exemplary embodiments, examples of which are illustrated in the accompanying drawings, wherein like reference numerals refer to like elements throughout.

Figure 2:
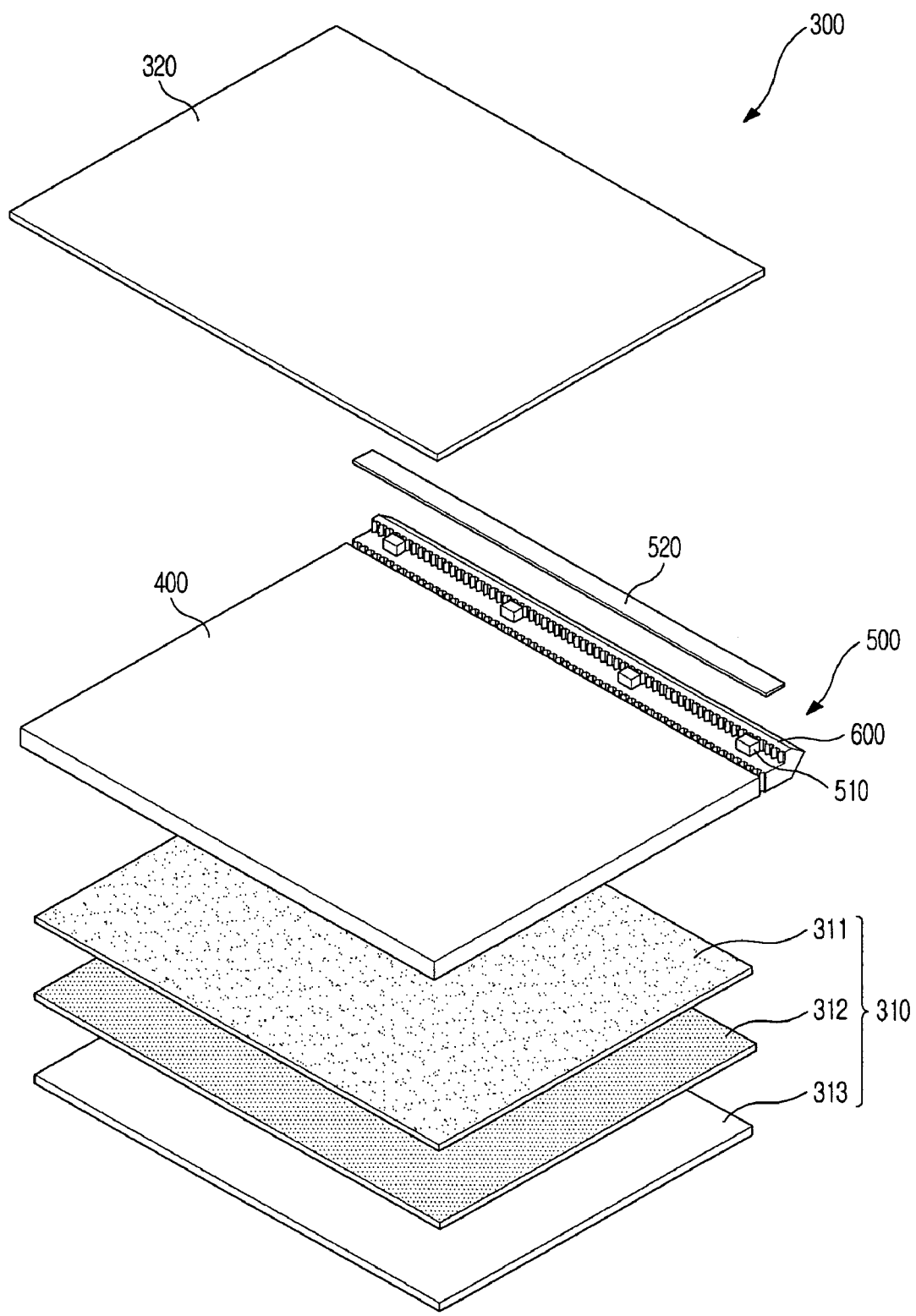
FIG. 2 is a perspective view illustrating a part of the liquid crystal display shown in FIG. 1 according to an exemplary embodiment, as observed from its bottom side.

FIG. 1 is a perspective view illustrating a liquid crystal display according to an exemplary embodiment and FIG. 2 is a perspective view illustrating a part of the liquid crystal display shown in FIG. 1 according to an exemplary embodiment, as observed from the bottom side.

As shown in FIGS. 1 and 2, the liquid crystal display 10 includes a liquid crystal panel 100, a driving element 200 connected at one side of the liquid crystal panel 100 to drive the liquid crystal panel 100, and a backlight unit 300 placed at a rear side of the liquid crystal panel 100 to provide light to the liquid crystal panel 100.

A periphery of the liquid crystal panel 100 is supported by a mold frame 140. The mold frame 140 and the backlight unit 300 are combined with a top cover 150 and a bottom cover 160, which enclose a front side and a rear side of the liquid crystal panel 100, respectively.

The liquid crystal panel 100 includes a thin film transistor substrate 110, a color filter substrate 120 attached opposite the thin film transistor substrate 110, and liquid crystal (not shown) introduced between the thin film transistor substrate 110 and the color filter substrate 120. Such liquid crystal panel 100 controls light transmittance of liquid crystal cells depending on image signal information received from the driving element 200, thus forming an image.

The driving element 200 is located at one side of the thin film transistor substrate 110 in order to apply driving signals to the liquid crystal panel 100. The driving element 200 may include a flexible printed circuit board 210, a driving chip 220 fixed to the flexible printed circuit board 210, and a circuit board 230 connected at the other side of the flexible printed circuit board 210.

The backlight unit 300 is positioned at a rear side of the liquid crystal panel 100. The backlight unit 300 includes an optical sheet 310 laminated on the rear side of the liquid crystal panel 100 to diffuse and collect light; a light guide panel 400 positioned at a rear side of the optical sheet 310; a light source 500 placed on at least one side of the light guide panel 400 to provide light to the liquid crystal panel 100; and a light reflection sheet 320 placed on a rear side of the light guide panel 400.

The optical sheet 310 formed in parallel to the rear side of the liquid crystal panel 100 may be fabricated by laminating a diffusion sheet 311, a prism sheet 312 and a protective sheet 313 in ascending order. The diffusion sheet 311 includes a base film (not shown) and a diffusion coating layer (not shown) formed on a front side of the base film, which serves to diffuse the light generated by the light source 500 and provide the diffused light to the liquid crystal panel 100.

The prism sheet 312 and the protective sheet 313 are placed on a top of the diffusion sheet 311. The prism sheet 312 has triangular prisms formed in a certain arrangement on a top thereof and vertically orients light passing through the diffusion sheet 311, thus improving brightness. The protective sheet 313 is formed on the prism sheet 312 in order to protect the diffusion sheet 311 and the prism sheet 312 which are susceptible to dust and/or scratches.

The light guide panel 400 may have a rectangular shape with a desired thickness. The light guide panel 400 is positioned opposite the light source 500 and includes a light incident side 400a to receive light emitted from the light source 500 and a light exit side 400b through which the light admitted through the light incident side 400a exits. The light guide panel 400 may be fabricated using polymethylmethacrylate (PMMA) which has high strength sufficient to prevent deformation or breakage thereof and excellent light transmission.

The light source 500 is placed along the light incident side 400a at one side of the light guide panel 400. The light source 500 may be arranged to face at least one side of the light guide panel 400.

The light source 500 may include an LED 510, a circuit board 520 to apply electric signals to the LED 510, and a light guide bar 600 to broaden a radiation angle of the light generated by the LED 510 which in turn uniformly guides the light to the light guide panel 400.

The LED 510 may have a rectangular shape. Since the LED 510 generates a large amount of heat, the circuit board 520 may be fabricated using aluminum with excellent heat transfer properties as a main material. A plurality of LEDs 510 is used and aligned on the circuit board 520 at equal intervals. Each of the LEDs 510 may include a white light emitting unit including blue, red and green LEDs 510.

The light guide bar 600 includes a first diffusion pattern 611 and a second diffusion pattern 631 in order to scatter light generated by the LED 510 and to guide the scattered light to a certain region. The light guide bar 600 may be fabricated using a material with excellent light reflection properties, which functions to convert LEDs 510 aligned in a row as a point light source into a linear light source form.

The light reflection sheet 320 reflects light leaked in an opposite direction of the liquid crystal panel 100, among the light emitted from the light source 500, to the light guide panel 400 so as to reduce loss of the light. The light reflection sheet 320 may be fabricated using polyethylene terephthalate (PET), polycarbonate (PC), etc.

The above described light guide panel 400, the light source 500 and the light reflection sheet 320 are enclosed in the bottom cover 160. As described above, the bottom cover 160 is combined with the mold frame 140 made of insulative synthetic resin.

Figure 3:
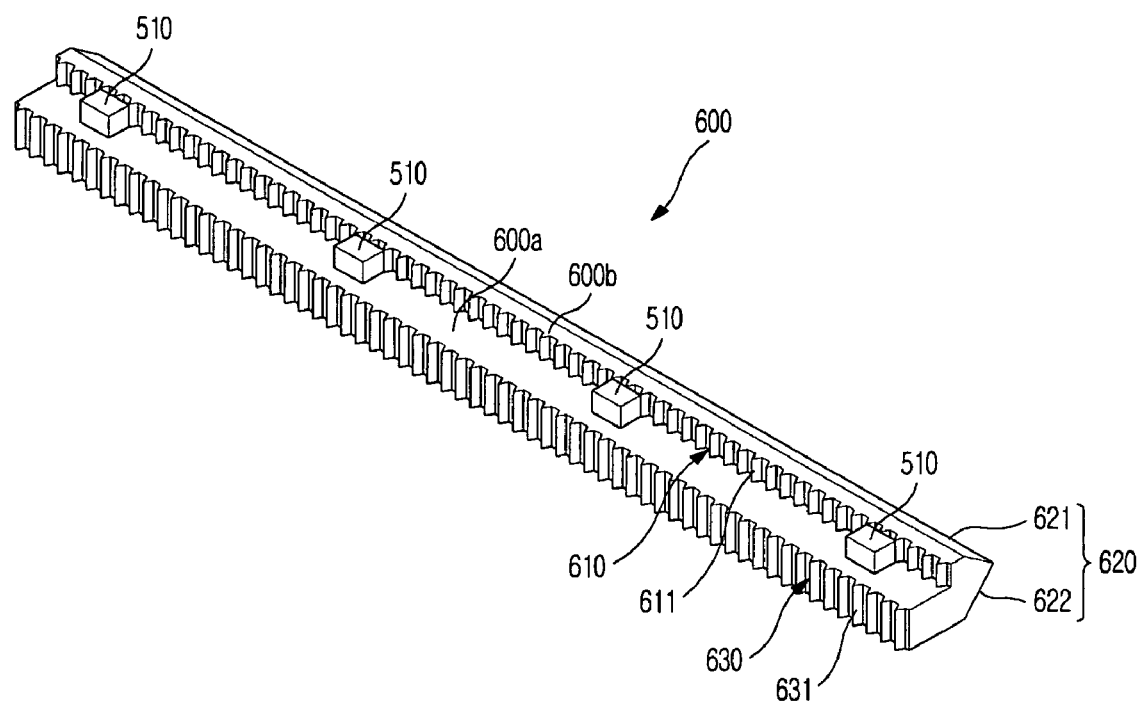
FIG. 3 is a perspective view illustrating a light guide bar shown in FIG. 2.
Figure 4:
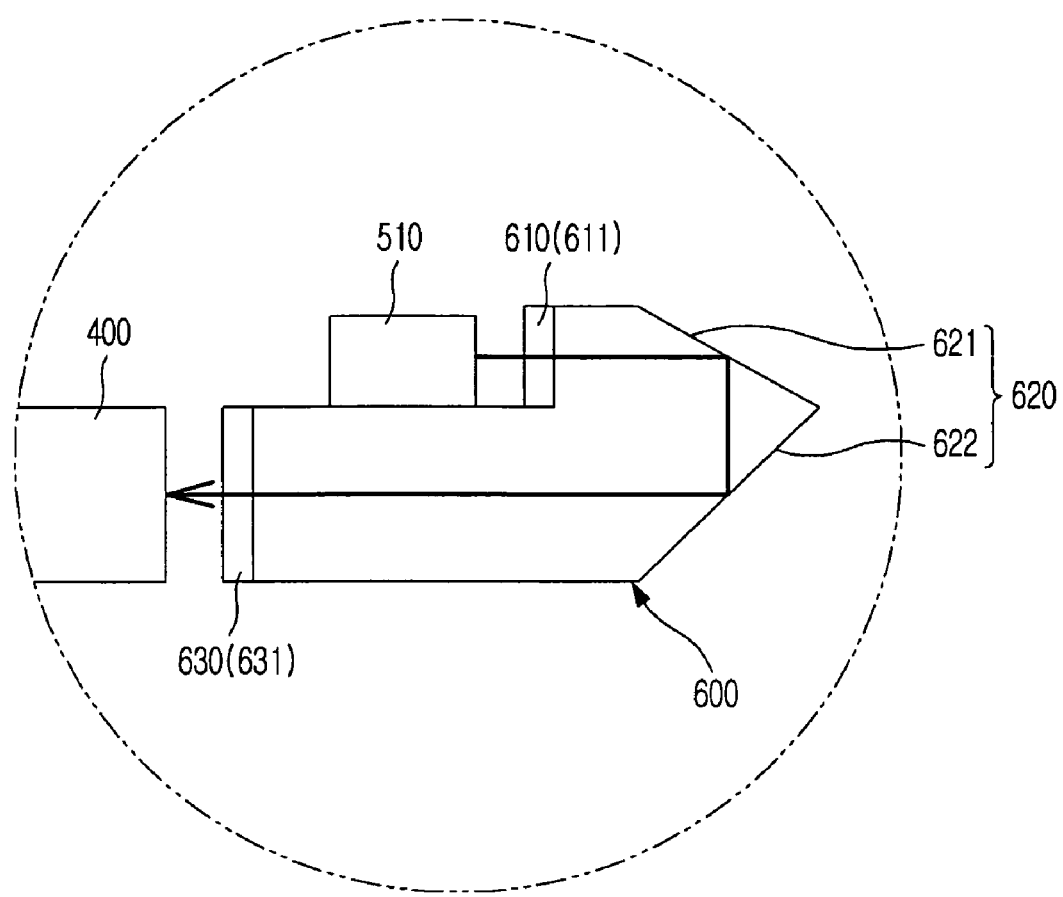
FIG. 4 is a schematic cross-sectional view illustrating a path of the light passing through the light guide bar shown in FIG. 3.
Figure 5A:
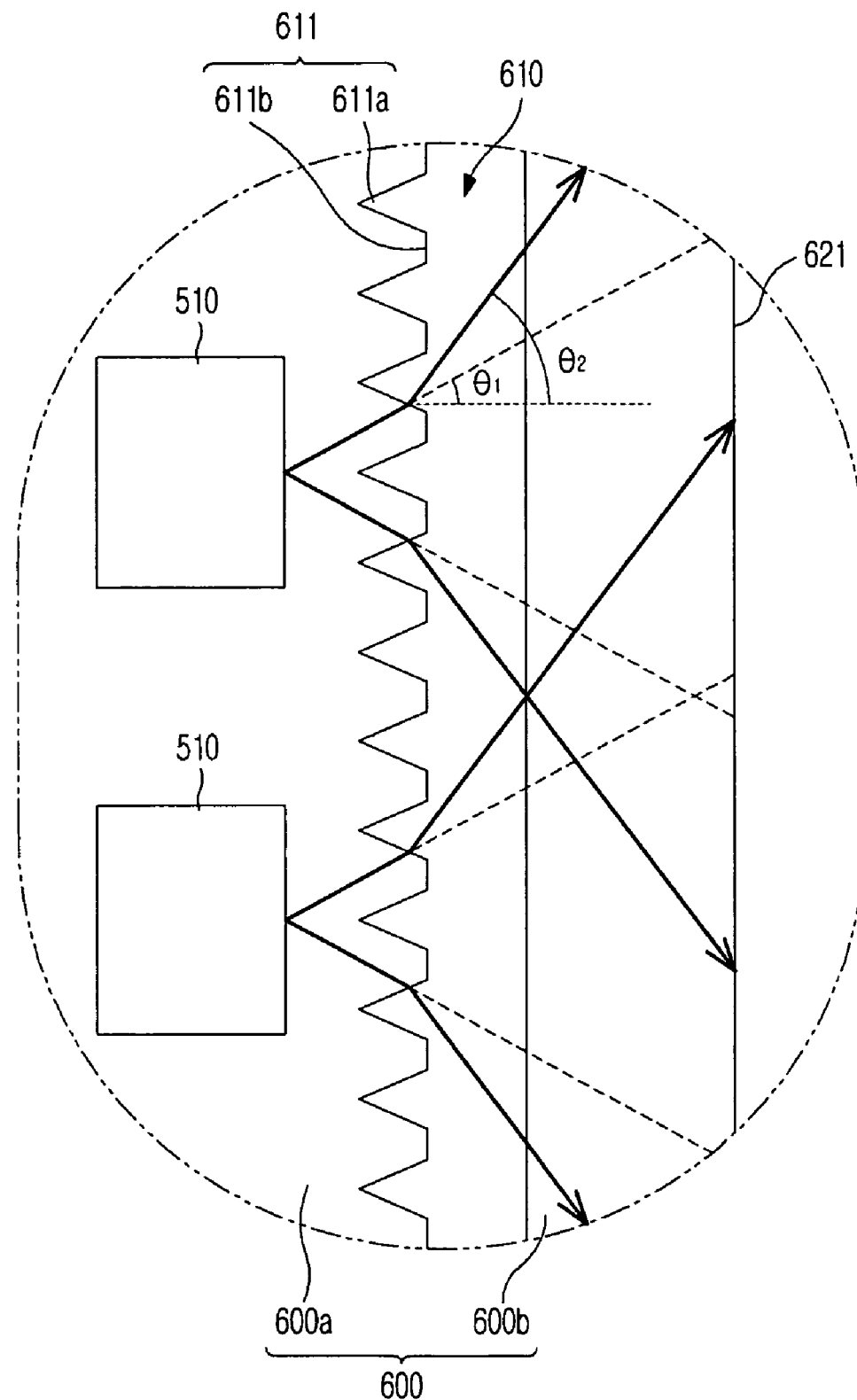
FIGS. 5A and 5B are enlarged views illustrating a part shown in FIG. 3, respectively.
Figure 5B:
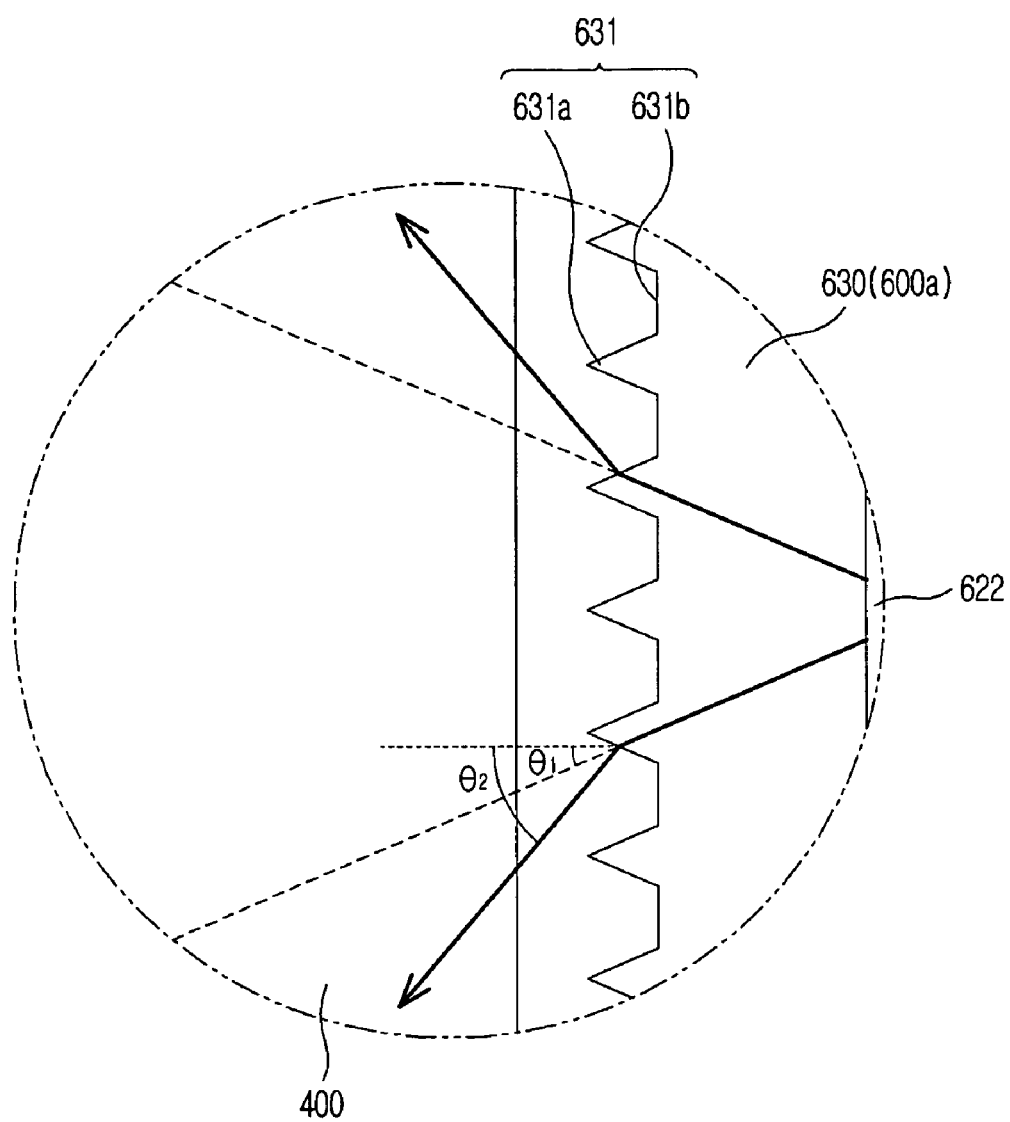

FIG. 3 is a perspective view illustrating a light guide bar shown in FIG. 2, FIG. 4 is a schematic cross-sectional view illustrating a path of the light passing through the light guide bar shown in FIG. 3, and FIGS. 5A and 5B are enlarged views illustrating a part shown in FIG. 3, respectively.

As shown in FIGS. 2, 3, 4, 5A and 5B, the backlight unit 300 includes a light guide bar 600 to uniformly guide light generated by an LED 510 to the light guide panel 400.

The light guide bar 600 includes the light incident part 610 with the first diffusion pattern 611 to receive light generated by the LED 510, a light reflection part 620 to reflect the light admitted through the light incident part 610, and the light exit part 630 with the second diffusion pattern 631 through which the light reflected through the light reflection part 620 to the light guide panel 400 exits.

The light guide bar 600 may include a base part 600a in a plate form and a threshold part 600b formed stepwise with a certain thickness at one end of the base part 600a. The light incident part 610 may be formed at a front side of the threshold part 600b opposite to the LED 510 while the light exit part 630 is formed at a front side of the base part 600a opposite to the light guide panel 400.

The light incident part 610 of the light guide bar 600 is placed facing the light guide panel 400 in order to extend a light path of the LED 510 and cause the light to overlap in a wide area between LEDs 510. That is, the plural LEDs 510 are aligned to generate light in a direction distant from the light guide panel 400. The light guide bar 600 uniformly admits the light into the light guide panel 400 by scattering and reflection.

The first diffusion pattern 611 extends in a length direction of the light guide bar 600. The first diffusion pattern 611 includes a plurality of first protrusions 611a and first depressions 611b repeatedly arranged at desired intervals in the length direction of the light guide bar 600. Each of the first protrusions 611a may have a triangular shape. However, a cross-sectional shape of the first protrusion 611a is not particularly restricted and may include an arc shape.

The light incident part 610 with the first diffusion pattern 611 may be formed with a certain height difference relative to the light exit part 630 with the second diffusion pattern 631. That is, the LED 510 is arranged between the base part 600a and the threshold part 600b, which are positioned stepwise to each other with a certain height difference. The LED 510 emits light in a direction distant from the light guide panel 400, and the light passes through the light incident part 610, the light reflection part 620 and the light exit part 630 of the light guide bar 600 in sequential order and is admitted into the light guide panel 400 so as to extend a path of the light, thus uniformly mixing light generated by the LED 510.

The first diffusion pattern 611 enlarges a radiation angle $\theta_2$ of the light passing through the first protrusion 611a, as compared to a radiation angle $\theta_1$ of the light admitted into the light guide bar 600 without the first protrusion 611a, thus distributing the light over a wider area. Therefore, the light generated by the LED 510 is first scattered in the first diffusion pattern 611 to provide uniform light power over the entire region of the light guide bar 600.

The light reflection part 620 includes a first reflecting part 621 for total reflection of the light with a wider radiation angle $\theta_2$ scattered by the first diffusion pattern 611 and a second reflecting part 622 for total reflection of the light reflected by the first reflecting part 621 to the second diffusion pattern side 631. The first reflecting part 621 performs total reflection of the light to the second reflecting part 622 and the second reflecting part 622 performs total reflection of the light to admit the light into the light guide panel 400. Here, the first reflecting part 621 may be placed at an edge of the threshold part 600b, while the second reflecting part 622 may be placed at an edge of the base part 600a.

Like the first diffusion pattern 611, the second diffusion pattern 631 extends in a length direction of the light guide bar 600. The second diffusion pattern 631 includes a plurality of second protrusions 631a and second depressions 631b repeatedly arranged at desired intervals. Each of the first protrusions 631a may also have a triangular or an arc shape.

The second diffusion pattern 631 enlarges a radiation angle $\theta_2$ of the light passing through the second protrusion 631a, as compared to a radiation angle $\theta_1$ of the light admitted into the light guide bar 600 without the second protrusion 631a, thus distributing the light over a wider area. Therefore, the light reflected from the second reflecting part 622 is finally scattered in the second diffusion pattern 631 to emit the light with uniform light power which in turn admits the light into the light guide panel 400.

Accordingly, light emitted from the LED 510 in an opposite direction of the light guide panel 400 follows a wider light path, thus being uniformly mixed. Moreover, scattering and reflection of the light in the light guide bar 600 may emit light with uniform light power and admit the light into the light guide panel 400, thereby solving a non-uniform brightness problem caused using the LED 510.

Figure 6:
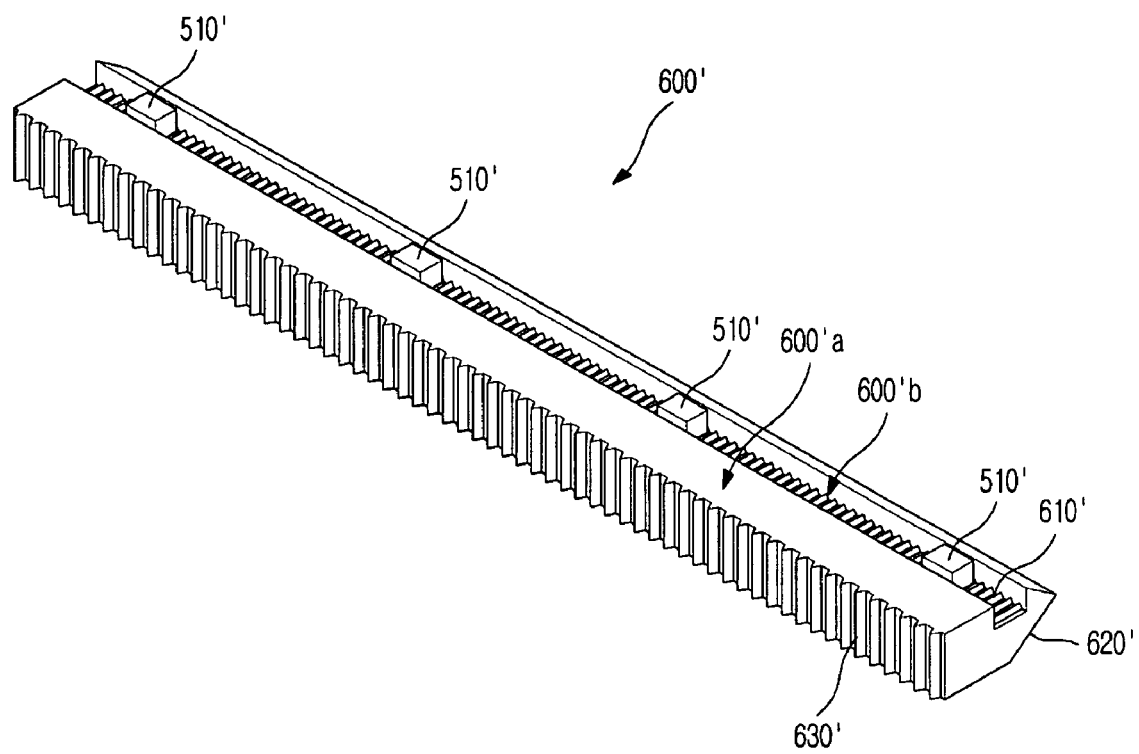
FIG. 6 is a perspective view illustrating a light guide bar according to another exemplary embodiment.

Another exemplary embodiment will be described in greater detail with reference to FIGS. 6 and 7. In these drawings, like reference numerals refer to like elements according to the previous exemplary embodiment and further detailed description of these elements will be omitted. FIG. 6 is a perspective view illustrating a light guide bar according to another exemplary embodiment, and FIG. 7 is a schematic plan view illustrating a path of the light passing through the light guide bar shown in FIG. 6.

Figure 7:
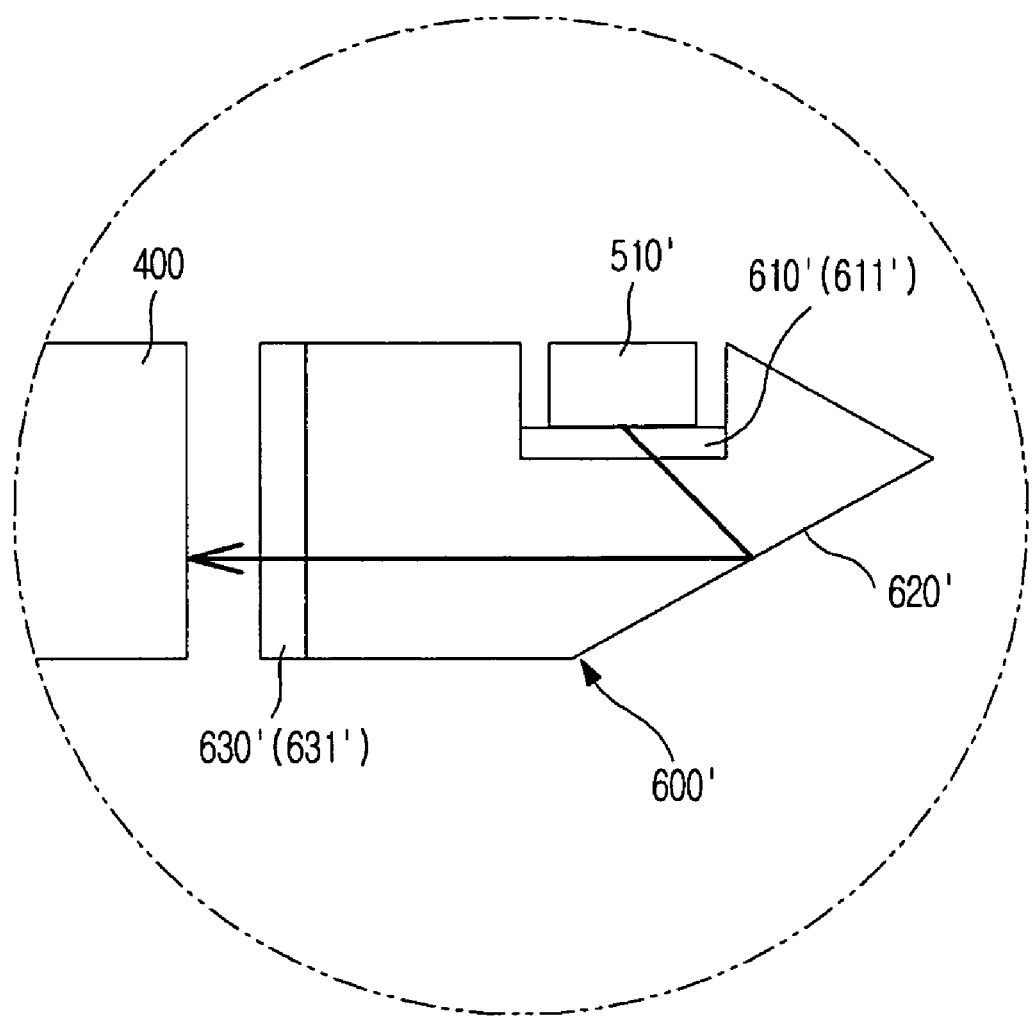
FIG. 7 is a schematic plan view illustrating a path of the light passing through the light guide bar shown in FIG. 6.

As shown in FIGS. 6 and 7, a light guide bar 600' includes a light incident part 610' with a first diffusion pattern 611' to receive light generated by an LED 510'; a light reflection part 620' to reflect the light admitted into the light incident part 610'; and a light exit part 630' with a second diffusion pattern 631' through which the light reflected through the light incident part 610' to the light guide panel 400 exits.

The light guide bar 600' may have a base part 600a' in a plate form and a depression part 600b' formed at a part of the base part 600a' to have a certain depth. The light incident part 610' may be formed at a top side of the depression part 600b' opposite to the LED 510 while the light exit part 630' is formed at a front side of the base part 600a' opposite to the light guide panel 400.

The LED 510' generates light downward, that is, in a thickness direction of the light guide bar 600' or the light guide panel (not shown), so as to extend a light path and uniformly mix the light generated by the LED 510'.

The light is first scattered by the light incident part 610' with the first diffusion pattern 611' in the light guide bar 600' and the scattered light is entirely reflected through the light reflection part 620' to the light exit part 630'. The light is finally scattered by the light exit part 630' with the second diffusion pattern 631' and admitted into the light guide panel (not shown).

Accordingly, the light emitted from the LED 510' in a thickness direction of the light guide panel (not shown) is scattered and reflected in the light guide bar 600', and then, is emitted with uniform light power and admitted into the light guide panel (not shown), thereby solving a non-uniform brightness problem caused using the LED 510'.

As is apparent from the above description, it may be understood that the backlight unit and the liquid crystal display according to exemplary embodiments adopt a light guide bar as a technical concept so as to uniformly provide light generated by LEDs to a light guide panel, thereby reducing non-uniformity of brightness and enhancing light efficiency.

Although a few exemplary embodiments have been shown and described, it would be appreciated by those skilled in the art that changes or modifications may be made in these exemplary embodiments without departing from the principles and spirit of the disclosure, the scope of which is defined in the claims and their equivalents.

What is claimed is:

1. A backlight unit, comprising:
   a light guide panel;
   at least one light emitting diode (LED) arranged at a lateral side of the light guide panel; and
   a light guide bar having a light diffusion pattern to scatter light generated by the at least one LED and admit the scattered light into the light guide panel,
   wherein the light guide bar includes:
   a light incident part with a first diffusion pattern to scatter light generated by the at least one LED;
   a light exit part with a second diffusion pattern to scatter light admitted into the light guide panel; and
   a light reflection part arranged between the light incident part and the light exit part, wherein the light incident part and the light exit part are positioned stepwise to each other.

2. The backlight unit according to claim 1, wherein the at least one LED is aligned to emit the light in a direction distant from the light guide panel.

3. The backlight unit according to claim 1, wherein the light diffusion pattern has a protrusion extending in a length direction of the light guide bar.

4. The backlight unit according to claim 1, wherein the light diffusion pattern includes a second diffusion pattern arranged opposite the light guide panel, in order to scatter the light admitted into the light guide panel.

5. The backlight unit according to claim 1, wherein the light reflection part includes a first reflecting part for total reflection of the light scattered by the first diffusion pattern and a second reflecting part for total reflection of the light reflected by the first reflecting part to the second diffusion pattern.

6. The backlight unit according to claim 1, wherein the at least one LED emits light in a thickness direction of the light guide bar and the emitted light is scattered by the light guide bar and then admitted into the light guide panel.

7. The backlight unit according to claim 1, wherein the light guide bar includes a base part in a plate form and a threshold part formed in a stepwise position at one end of the base part, and the light incident part is formed on a front side of the threshold part opposite to the at least one LED while the light exit part is formed on a front side of the base part opposite to the light guide panel.

8. The backlight unit according to claim 1, wherein the light guide bar includes a base part in a plate form and a depression part formed in a portion of the base part, and the light incident part is formed on a front side of the depression part opposite to the at least one LED while the light exit part is formed on a front side of the base part opposite to the light guide panel.

9. The backlight unit according to claim 1, wherein the first diffusion pattern is arranged opposite the at least one LED.

10. A backlight unit comprising:
    a plurality of light emitting diodes (LEDs) spaced at a certain interval;
    a light guide bar having a light diffusion pattern to convert light generated by the LEDs into a linear light source; and
    a light guide panel to receive the converted light from one side of the light guide bar,
    wherein the light guide bar includes:
    a light incident part with a first diffusion pattern to scatter light generated by the at least one LED;
    a light exit part with a second diffusion pattern to scatter light admitted into the light guide panel; and
    a light reflection part arranged between the light incident part and the light exit part, wherein the light incident part and the light exit part are positioned stepwise to each other.

11. The backlight unit according to claim 10, wherein the light incident part and the light exit part are positioned opposite the light guide panel, and wherein the light incident part and the light exit part are positioned stepwise to each other.

12. The backlight unit according to claim 10, wherein the light guide bar is arranged to scatter light emitted from the LEDs in a thickness direction, followed by admitting the scattered light into the light guide panel.

13. The backlight unit according to claim 10, wherein the first diffusion pattern is positioned opposite the LEDs and the second diffusion pattern is positioned opposite the light guide panel in order to scatter light admitted into the light guide panel.

14. A liquid crystal display including a liquid crystal panel to display an image and a backlight unit to provide light to the liquid crystal panel, wherein the backlight unit comprises:
    a light guide panel; a plurality of point light sources arranged at a lateral side of the light guide panel; and
    a light guide bar having at least one light diffusion pattern to scatter light generated by the point light sources, in order to uniformly admit the light into the light guide panel,
    wherein the light guide bar includes:
    a light incident part with a first diffusion pattern to scatter light generated by the point light sources;
    a light exit part with a second diffusion pattern to scatter light admitted into the light guide panel; and a light reflection part arranged between the light incident part and the light exit part.

15. The liquid crystal display according to claim 14, wherein each of the point light sources generates light in an opposite direction or a thickness direction of the light guide panel to extend a path of the light.

16. The liquid crystal display according to claim 14, wherein each point light source includes a light emitting diode (LED).

* * * * *